(12) United States Patent
White

(10) Patent No.: US 6,443,352 B1
(45) Date of Patent: Sep. 3, 2002

(54) ELECTRICAL RESISTANCE BASED OBJECT CONSOLIDATION

(75) Inventor: Dawn White, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 1 day.

(21) Appl. No.: 09/670,624

(22) Filed: Sep. 27, 2000

Related U.S. Application Data

(60) Provisional application No. 60/156,251, filed on Sep. 27, 1999.

(51) Int. Cl.[7] .............................................. B23K 11/06
(52) U.S. Cl. ......................................... 228/158; 219/83
(58) Field of Search ........................ 228/158; 219/91.2, 219/91.21, 91.22, 91.23, 92, 93, 94, 81, 82, 83; 427/470

(56) References Cited

U.S. PATENT DOCUMENTS

| | | | | |
|---|---|---|---|---|
| 3,598,953 A | * | 8/1971 | Campbell ................. | 219/78.02 |
| 3,654,422 A | * | 4/1972 | Erlandson .................... | 219/81 |
| 3,800,118 A | * | 3/1974 | Wefers et al. | |
| 3,989,919 A | * | 11/1976 | Wefers et al. ................. | 219/92 |
| 4,009,362 A | * | 2/1977 | Becker ......................... | 219/92 |
| 4,117,296 A | * | 9/1978 | Becker ........................ | 219/113 |
| 4,327,156 A | | 4/1982 | Dillon et al. ................ | 428/568 |
| 4,775,092 A | | 10/1988 | Edmonds et al. ............ | 228/222 |
| 4,795,875 A | * | 1/1989 | Urech ......................... | 219/119 |
| 5,059,326 A | * | 10/1991 | Haerle ........................ | 210/491 |
| 5,126,529 A | | 6/1992 | Weiss et al. ............. | 219/121.6 |
| 5,207,371 A | | 5/1993 | Prinz et al. .................. | 228/125 |
| 5,387,380 A | | 2/1995 | Cima et al. .................... | 264/69 |
| 5,470,651 A | | 11/1995 | Milinkovic et al. .......... | 428/325 |
| 5,578,227 A | | 11/1996 | Ravinovich ............ | 219/121.63 |
| 5,614,075 A | | 3/1997 | Andre, Sr. ..................... | 205/67 |
| 5,883,354 A | * | 3/1999 | Elofson .................... | 219/117.1 |
| 5,961,862 A | | 10/1999 | Lewis et al. ........... | 219/121.84 |
| 5,976,339 A | | 11/1999 | Andre, Sr. ..................... | 205/70 |

OTHER PUBLICATIONS

R. L. O'Brien, Welding Handbook, vol. 2, Chapter 25, 1991.

\* cited by examiner

*Primary Examiner*—Tom Dunn
*Assistant Examiner*—Jonathan Johnson
(74) *Attorney, Agent, or Firm*—Gifford, Krass, Groh, Sprinkle, Anderson & Citkowski, PC

(57) ABSTRACT

Resistance heating, preferably with applied pressure, is used to consolidate incremental volumes of material to produce a desired object in accordance with a description thereof. The joining of the material increments may occur in the solid state, liquid state, or 'mushy' state in conjunction an atomically clean faying surface between the increments without melting the material in bulk. Residual stresses are minimized, particularly in metal objects, by imposing a compressive residual stress on the surface of each deposited layer or increment, which offsets all or a portion of the tensile stress created as the next layer deposited above it cools. In terms of apparatus, a moving cathode is used to ensure uniform electrical current flow in an object with constantly changing geometry. The contact resistance of the interface between the workpieces is preferably continuously measured, and the sensor data is used to update a look-up table, or as input to an adaptive closed loop control system to ensure consistent welding conditions as object geometry changes continually. Also disclosed are embodiments associated with the fabrication of functionally gradient materials.

20 Claims, 4 Drawing Sheets

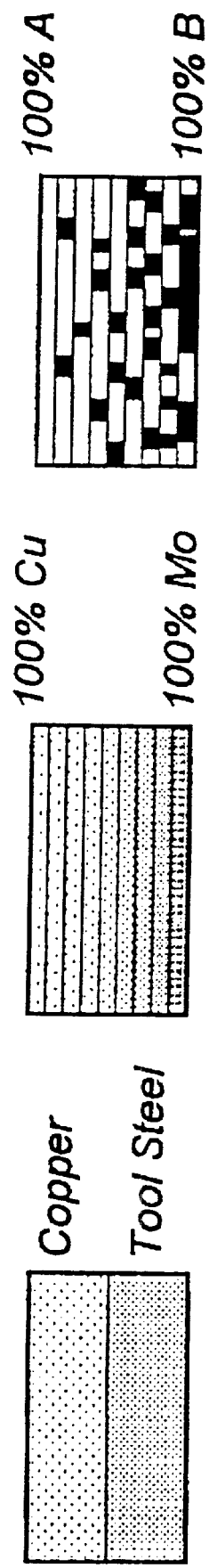

ELECTRICAL RESISTANCE BASED OBJECT CONSOLIDATION

REFERENCE TO RELATED APPLICATIONS

This application claims priority of U.S. provisional patent application Serial No. 60/156,251 filed Sep. 27, 1999, the entire contents of which are incorporated herein by reference.

FIELD OF THE INVENTION

The present invention relates generally to fabrication of objects and prototypes through the sequential deposition of material. More particularly, the invention relates to the consolidation of material increments using electrical resistance to form objects.

BACKGROUND OF THE INVENTION

Numerous manufacturing technologies for producing objects by sequentially adding material exist, with the casting of liquid metal being perhaps the oldest such technique. In the past two decades, various processes for fabricating objects to net shape solely through material addition, i.e. without a finishing step such as machining to produce detailed, high-precision features, have been patented and, in a few cases, commercialized.

Most of these additive manufacturing processes either rely on an adhesive, or a solidification process in order to produce a bond between previously deposited material and each incremental volume of material which is added. Although the use of adhesives is convenient, the properties of the adhesive control the properties of the finished object, and this limits the usefulness of such processes in the production of engineering parts and products.

Processes which use solidification transformations result in objects with relatively uniform physical and mechanical properties, because the liquid which is present as each volume of material is added wets the previously deposited material, effectively acting as an adhesive with properties identical to those of the bulk material.

The most commercially successful of these technologies is stereolithography, in which a focused light source (typically an ultraviolet laser) is used to solidify a liquid photocuring polymer. As the laser focal point travels through a vat of liquid polymer, the polymer locally solidifies, and eventually, through appropriate programming of the motion of the focal point, a solid object is built.

Although several techniques have been developed and commercialized, the technologies available for additively producing metal objects are limited. Since the Bronze Age, humans have used forging as a means of producing objects by adding small volumes of material to shapes and hammering them to final dimensions. More recently, three-dimensional arc welding (shape melting), as described and patented by Edmonds et al., (U.S. Pat. No. 4,775,092) has been suggested as an approach to production of net shape metal components.

Prinz, U.S. Pat. No. 5,207,371, has also developed shape deposition modeling in which two types of molten metal are sequentially deposited to produce net shape. Prinz and others have shown that in addition to arc welding, laser deposition and thermal spraying may be used as the basis for forming net shape objects layer by layer, if masks are used at intervals sufficient to define the cross sections of the desired object (See U.S. Pat. No. 5,126,529). Kovacevic has refined the methods of Edmonds and included milling to improve object dimensional accuracy.

Laser melting and deposition have been developed extensively in the U.S. and Germany. Based on cladding technologies developed in the 1980s, processes such as laser engineered net shaping and direct metal deposition are being commercialized (See Lewis, U.S. Pat. No. 5,961,862). Laser direct metal deposition is under development by researchers around the world, including Sandia National Laboratory, Los Alamos National Laboratory, Optomec Inc., and Precision Optical Manufacturing in the United States, and the Fraunhofer Institute in Germany. In essence, the process involves the injection of metal powders into a high power laser beam, while the laser is rastered across a part surface. The powders are melted in the beam, and deposited under the influence primarily of gravity.

Other processes for producing net shape metal objects via material deposition involve the use of low melting point materials to join sheets or powders. For example, brazing of laminated objects has been described (patents) in which steel sheets are cut to the geometries of sequential cross sections of a part, and then furnace brazed together. A copper, titanium or nickel based braze alloy is generally used, with copper alloys having the lowest melting points, and ease of use.

A closely related technique uses infiltration of a low surface tension, low melting point alloy to fill voids in object made by compacting or printing metal powders has also been employed. For example, Cima et al. have patented a three-dimensional printing process, in which metal powders are ink jet printed in layers, and a binder is used to hold the shape of the printed object (U.S. Pat. No. 5,387,380). Following firing of this green part to remove the binder, the infiltrant can be added to produce a solid metal object (Dillon Infiltrated Powdered Metal Composite Article (U.S. Pat. No. 4,327,156). This technique is being commercialized by Extrude Hone Corporation. Other powder metallurgy techniques for producing metal objects to net shape involve the use of a pattern against which powders are densified using various combinations of elevated temperatures and pressures to produce a fully dense, net shape part.

In U.S. Pat. No. 5,578,227, Rabinovich describes a method in which a wire or filament feedstock is used and applied to a growing object while maintaining a substantially identical cross section by remotely heating the nit point at which the feedstock is fed onto and is tangent to the existing surface. Rabinovich proposes use of a laser to heat this location to them melting point.

Electroforming, or plating, has also been commercialized for additive manufacturing of metal components. This mature technology has recently been used to produce shells on near net shape patterns to produce objects, usually tooling inserts for the injection molding process. Electroforming is a very slow process. It typically takes up to two weeks to produce a shell 0.25" thick in a material such as nickel which has sufficient strength and wear resistance to be used as permanent tooling. As a result, this process is used only to create shells which require backfilling by some secondary material. Metal powder filled epoxies are most often used, however, ceramic slurries, other plastics, cements, and low melting points metals have all been used.

Electroforming has other drawbacks besides extremely low deposition rate as a near net shape forming technology. In the electroforming process, metal salts are dissolved in an aqueous solution. When an electrical current passes through this bath, metal is deposited on the negatively charged surface (in net shape electroforming applications such as tooling, this will be a model which is the inverse of the desired final shape). Aqueous solutions of metal salts are generally toxic, and sludges form in these baths as a byproduct of the process. Both the liquid and the sludges are hazardous materials which must be handled and disposed of appropriately. It is noteworthy that Andre has patented a method of fabricating layered structures using masks and electroplating (U.S. Pat. Nos. 5,976,339 and 5,614,075).

More recently, nickel vapor deposition has been employed as a means of producing nickel shells for net shape fabrication applications. Nickel vapor deposition (NVD) allows thicker shells to be produced as deposition rates are higher than electroforming (Milinkovic, 1995). However, NVD involves the use of highly toxic gases and a specialized reaction chamber. The cost and risk of this technology are both very high.

Resistance heating is a widely used process for fabricating structures as diverse as automobile bodies, electronic equipment and piping. It operates on the principle that heat is generated when electrical current flows through a conducting medium. The amount of heat generated is proportional to the current flow and degree of resistance to it in the carrying medium according to $Q=I^2Rt$, where Q is heat generated in joules, I is current in amperes, R is resistivity of the material in ohms, and t is time in seconds.

In terms of technology, oxygen-free high-conductivity (OFHC) copper has very low resistance, and can carry very high currents with little heating. Nickel-chromium alloys have high resistivity and are used to produce heating elements; when high currents are passed through them, the elements produce heat for ovens, furnaces, water heaters, etc.

In most resistance joining applications, high-conductivity copper electrodes are used to conduct current through the lower conductivity work pieces. The interface between the two workpieces is the location of the greatest resistance in the circuit, and it will heat up the most quickly and to the highest temperature. This is illustrated in FIG. 1. Conveniently, this is the very location at which a joint is desired. The current is selected to provide conditions under which a joint can form, and pressure is applied via the electrodes. Depending on the application, the electrical current and pressure may be pulsed through several cycles. A range of resistance joining processes exist including spot welding, seam welding, stud welding, flash butt welding, etc., but so far, the approach has not been applied to the consolidation of net-shape or near-net shape objects.

Novel processes for additive manufacturing of net shape objects composed of metals are clearly needed. The technologies described above are limited in their capability, use expensive equipment, and typically have safety hazards associated with the presence of lasers, liquid metals and powders.

SUMMARY OF THE INVENTION

This invention resides in an additive manufacturing apparatus and methods wherein resistance heating, preferably with applied pressure, is applied uniformly, or cyclically, so as to consolidate incremental volumes of material to produce a desired object in accordance with a description thereof.

Depending upon the particular parameters of the process, the joining of the material increments may occur in the solid state, liquid state or 'mushy' state. In all embodiments, however, the process produces an atomically clean faying surface between the increments without melting the material in bulk.

Residual stresses are minimized, particularly in metal objects, by imposing a compressive residual stress on the surface of each deposited layer or increment, which offsets all or a portion of the tensile stress created as the next layer deposited above it cools. In terms of apparatus, a moving cathode is used to ensure uniform electrical current flow in an object with constantly changing geometry.

In the preferred embodiment, the contact resistance of the interface between the workpieces is continuously measured, and the sensor data is used to update a look-up table, or as input to an adaptive closed loop control system to ensure consistent welding conditions as object geometry changes continually. Also disclosed are embodiments associated with the fabrication of functionally gradient materials.

BRIEF DESCRIPTION OF THE DRAWINGS

FIGS. 6A through 6C show how changes in composition may be effected during the fabrication of an object according to the invention, with layers being deposited and consolidated in sheet, filament or dot-wise fashion. In particular, FIG. 6A shows a discontinuous change from tool steel to nickel-based alloy; FIG. 6B shows a gradual change from molybdenum to steel using sheet or filament material of varying composition, and FIG. 6C shows a functionally gradient material produced by the dot-wise application of two materials, A and B.

DETAILED DESCRIPTION OF THE INVENTION

Before describing the preferred and alternative embodiments in detail, it is worthwhile noting that resistance heating and consolidation has several important advantages for solid, free-form fabrication. First, if the correct electrical and force parameters are selected, a joint can be produced in the solid or mushy state, without the presence of liquid metal. This reduces environmental and safety hazards in comparison to liquid metal processes, as well as the total amount of energy used by the process. Second, during resistance heating electrical energy is converted to thermal energy directly at the faying surface where it is being used to consolidate components, rather than at some remote location (such as a laser) from which it must be transferred to the object being built.

Third, since energy is generated directly at the faying surfaces, only the material immediately at the location being consolidated need be heated to the consolidation temperature. This reduces total energy usage, and, as important, total heat input. During layered manufacturing of metals using techniques such as shape melting and laser metal deposition, molten metal is generated and transported to the surface of the growing object. This creates more heat in the layered structure resulting in high residual stresses which can cause warping or cracking of the parts. Eliminating these stresses often requires annealing via furnace treatments or reheating using a power source such as a laser and which adds time, cost and complexity to the process.

A fourth advantage of the resistance joining approach to additive manufacturing is that compressive loads are used to create the bond at the faying surfaces. Electrical resistance heats the region being consolidated to a temperature at which the material is highly plastic or mushy, as required to join the material, and a compressive load is applied to effect a defect free joint. As a result, tensile residual stresses are reduced. In addition, compressive residual stresses can be deliberately produced in the surface in order to minimize total stress in the joint region when the next layer is placed.

If compressive stresses are deliberately induced in the surface of the growing structure as material is added, when tensile stresses are produced as a result of material addition, the overall stress in the part should be lower following processing than if a surface with a neutral stress state had been acted on by a process which imposes tensile residual stresses. This is similar to the principal on which processes such as shot peening operate; a compressive residual stress is induced in the surface of a part which will operate under a cyclic tensile stress. This serves to reduce the mean stress on the part, and extend its operating life in fatigue. Although this is being discussed with reference to electrical resistance joining, the phenomenon holds true regardless of the additive manufacturing process used.

Figure 1:
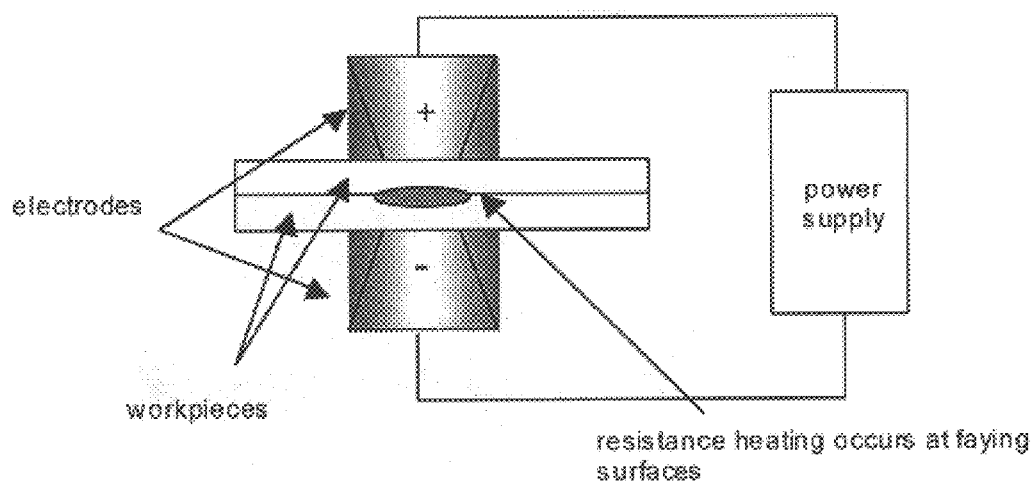
FIG. 1 is a side-view drawing in partial cross-section which illustrates a resistance-based object consolidation process according to the invention.
Figure 2:
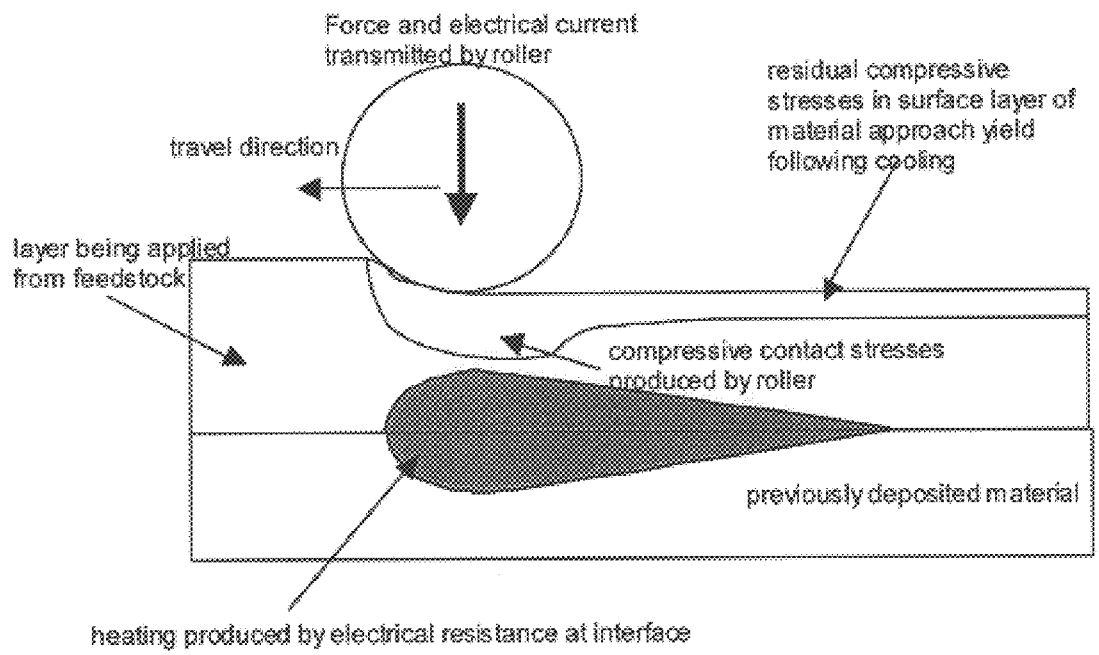
FIG. 2 illustrates a general approach to the application of a strip or wire to an object via resistance heating and pressure.

From the point of view of resistance joining technology, solid free form fabrication qualifies as a microresistance joining application. In order to achieve dimensional accuracy, it is desirable to use a small diameter wire, or thin foil material to apply increments of volume to the object being built, as in any additive manufacturing process. FIG. 2 illustrates a general approach to the application of a strip or wire to an object via resistance heating and pressure.

Maintaining a relatively constant current flow during resistance joining is critical to the consistent quality of the joints. Changes in current paths as the object geometry changes are well known to users of this process for sheet metal joining in industries such as appliance and automobile manufacturing. This phenomenon is known as "shunting." Shunting can reduce the effective current at the location of interest for joining causing poor quality or absent joints. In solid free form fabrication, the shape of the object is constantly changing, and electrical current flow will change with it. As a result, special means must be employed to ensure that sufficient heat is created at the interface to produce a quality joint. There are several possible methods available to accomplish this.

Figure 3:
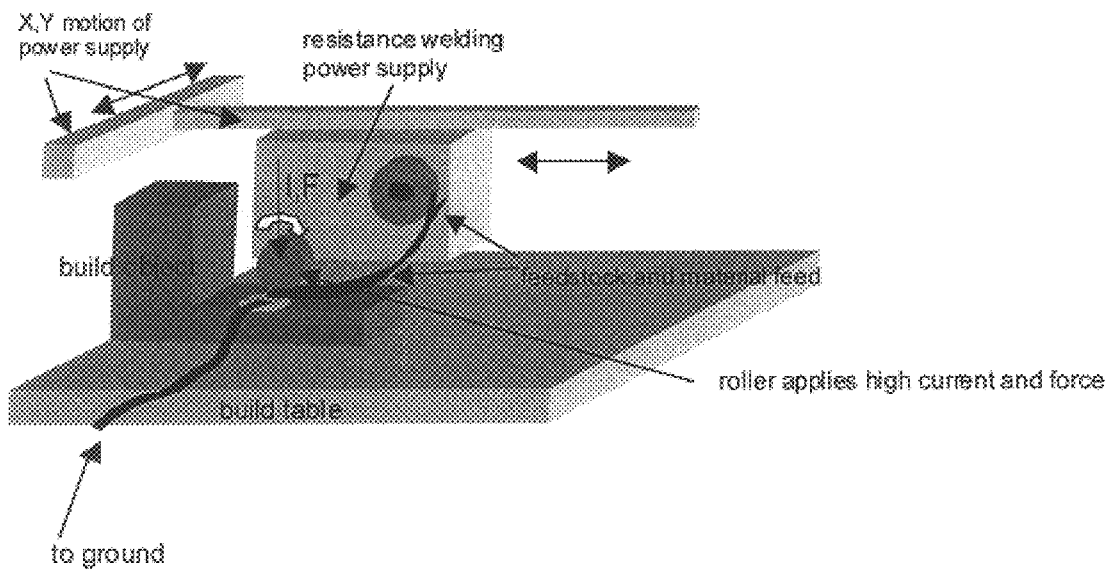
FIG. 3 is a drawing which shows how an electrode may travel immediately in front of a region being joined.
Figure 4:
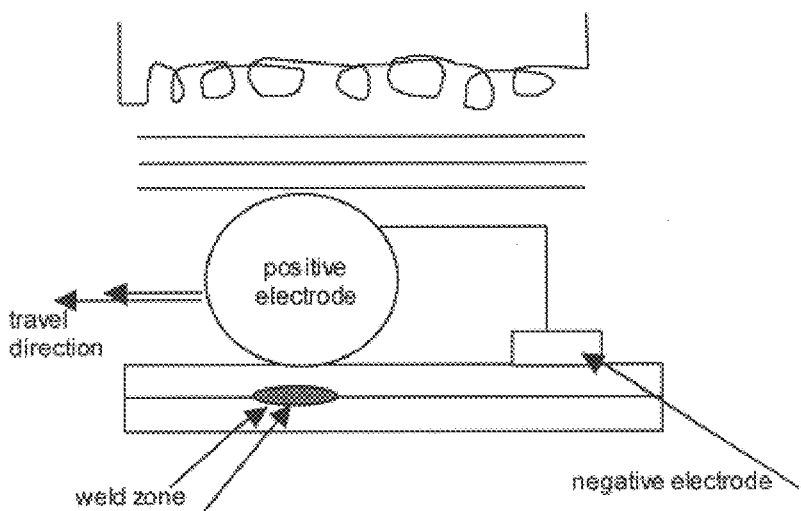
FIG. 4 is a block diagram which illustrates how deposition may be monitored in real time using an adaptive controller arrangement and look-up table according to the invention.

One is to employ a traveling anode (or cathode), electrode to which electrons are flowing as they pass through the joint. This helps to maintain a more constant electrical path as the object shape changes. This electrode travels immediately in front of the region being joined, as illustrated in FIG. 3. A second method is to constantly measure the contact resistance at the interface between the previously deposited layer and the material being added at any instant. This is checked against a real time adaptive controller, or a look up table to adjust current and pressure as required to produce process conditions which ensure high quality consolidation at all times. A schematic illustration of this arrangement is shown in FIG. 4. A traveling electrode and a continuous contact resistance measurement arrangement are desirably combined to further enhance process consistency.

Figure 5:
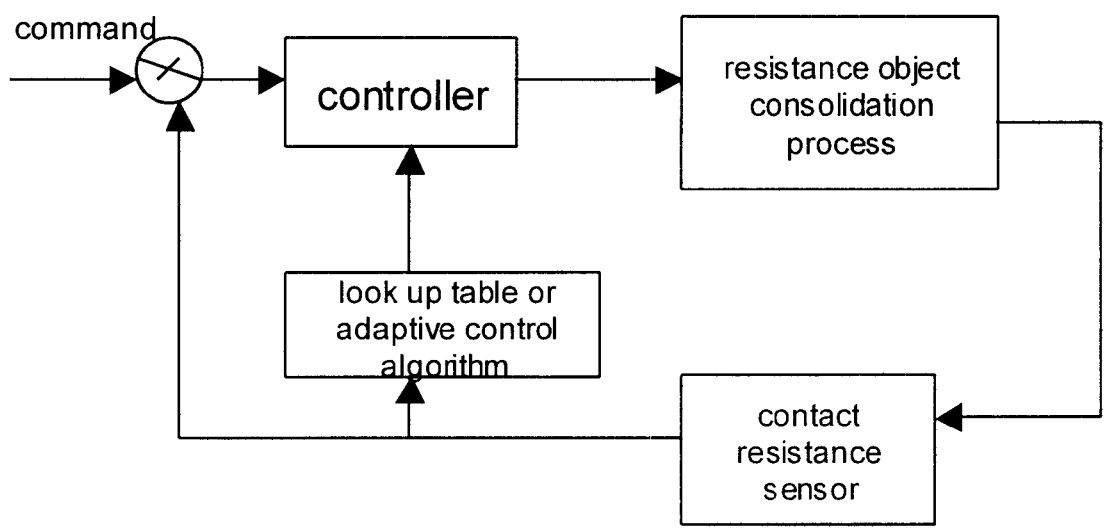
FIG. 5 is a drawing which depicts an indirect welding situation, wherein the power return connection is arranged to accommodate a part geometry which does not permit the use of symmetrical, opposed electrodes.

In the most common resistance spot welding processes, such as those usually employed in the manufacture of automobile bodies, or consumer appliances, a direct circuit is used. That is, a positively charged electrode transmits current to the work pieces, and a negative electrode facing it, returns the energy to close the electrical circuit. In the case of resistance object consolidation, an indirect weld circuit must be employed, as the constantly changing geometry of the object, lack of backside access, and growing thickness of the object, mean that it will be impossible to locate an electrode directly below the moving weld zone. In an indirect welding situation, the power return connection is arranged to accommodate a part geometry which does not permit the use of symmetrical, opposed electrodes. FIG. 5 illustrates schematically such an arrangement, which is suited to resistance object consolidation.

Although the illustrated embodiment employs a strip or tape feedstock, it will be evident to a reader skilled in the art that wires of various cross sections could be employed. In addition, a wheel having an eccentric cross section design to mash the added material, or create a desired surface contour or texture could be employed. Further variations would be apparent to those familiar with resistance welding technologies.

The system and method may incorporate the use of support materials to provide suitable substrates for any features of the object, which, when viewed sectionally, are overhanging. A description of the support resides in the CAD system, enabling the support to be built sequentially and additively. The support is preferably composed of less valuable material which is removed by stripping, cutting, dissolution, or by melting, when material having a lower melting-point than that of the object is used.

As examples, useful support materials include ceramics, particularly rapidly curing, water-soluble ceramics, and metal foils which do not bond but can be compressed so as to hold up the build portion. The support materials may be consolidated using the same power supply and different joining parameters, though not every layer or increment of the support need be bonded to the next layer, nor does the support need be fully consolidated. Indeed, weakly or partially bonded support material may be removed by breaking it up and shaking it loose using ultrasonic vibrations of appropriate frequency.

Appropriate materials may include alloys such as solders, copper-based brazes, nickel-based brazes or titanium-based brazes, or a granular ceramic or other electrically insulating material which can be compressed during the consolidation process while providing the requisite degree of structural support, but will not be substantially affected by resistance heating due its electrical resistance nature. Such materials may include, but are not limited to, silica, zirconia, alumina, salts, clays, plasters.

Resistance object consolidation also has certain advantages as a means of preparing functionally gradient, net shape objects, as shown in FIGS. 6A through 6C. Functionally gradient materials are those in which material composition is varied, whether rapidly or gradually, in order to allow a single component to more efficiently meet engineering service requirements. Examples of rapid functional composition gradients include injection molding tools in which a copper zone is cofabricated with the tool steel (for example by electroplating, or laser direct metal deposition), in order to improve heat transfer in certain locations. Other examples are found in the hot zones of turbine engines and rocket motors, where it may be desirable to have a gradual gradient between a metal and a ceramic, or a metal and an intermetallic compound so that certain areas of a part feature enhanced heat resistance, while others have excellent ductility.

Fabrication of functionally gradient materials often presents difficulties, because the materials may be metallurgically incompatible in the case of rapid variation, or because certain compositions may be very difficult to fabricate in the case of gradual variation. Resistance object consolidation has certain advantages as a means of preparing functionally gradient, net shape objects in comparison to previous art. Resistance joining can occur at temperatures below the melting point of the workpieces. There are many material systems where liquid-phase metallurgical processes result in formation of intermetallics, brittle phases, immiscible liquids, etc. making it very difficult to produce functionally gradient materials using conventional fusion approaches. Some of the materials systems are well suited to resistance consolidation. However, it is important to have compatible electrical resistivity in the two materials.

I claim:

1. A method of fabricating an object through sequential material deposition, comprising the steps of:

providing a description of the object to be fabricated;

providing a material feedstock;

forming the object by consolidating material increments in accordance with the description of the object using electrical resistance heating to create a localized plastic flow, mushy zone, or melted region at the interface between the previously deposited material and each new increment without melting the material in bulk; and removing any excess material.

2. The method of claim 1, further including the step of applying pressure to the material increments during consolidation.

3. The method of claim 1, wherein the electrical energy and/or pressure are applied uniformly or cyclically.

4. The method of claim 1, wherein the resistance to the applied energy is such that the material increments are consolidated in a solid or liquid state.

5. The method of claim 1, further including the step of imposing a compressive residual stress on the surface of each deposited layer or increment to at least partially offset the build-up of tensile stress.

6. The method of claim 1, wherein the material is provided in the form of sheets, elongated tapes, filaments, dots or droplets.

7. The method of claim 1, wherein material increments define a discontinuous or gradual change in material composition.

8. The method of claim 1, wherein the description of the object is provided in the form of a computer-aided design or manufacturing (CAD/CAM) file.

9. The method of claim 1, wherein the process passes the energy through the material increment during the deposition thereof.

10. The method of claim 1, wherein the material is provided in the form of thin layers, and one or more of the layers are cut into a shape corresponding to the description of the object prior to the step of consolidating the layer.

11. The method of claim 1, wherein the material is provided in the form of thin layers, and one or more of the layers are consolidated then trimmed in accordance with the description of the object.

12. The method of claim 1, wherein the material is provided in the form of a plurality of thin layers which are consolidated one layer at a time.

13. The method of claim 1, wherein alternating layers of reinforcement fibers and metallic powders, foils, or a combination thereof, are used to fabricate a metal-matrix composite object.

14. The method of claim 1, wherein:

the material is provided in the form of a tape having a width; and the description of the object takes the width of the tape into account.

15. The method of claim 1, wherein:

the object includes an overhanging, cantilevered or enclosed feature; and support material is used to support the feature.

16. The method of claim 15, wherein the support material has a melting point which is different than the material used to form the object.

17. The method of claim 16, wherein the support material is:

an alloy including solders, copper-based brazes, nickel-based brazes or titanium-based brazes, or a granular ceramic or other electrically insulating material, including silica, zirconia, alumina, salts, clays, plasters.

18. The method of claim 1, further including the step of providing a computer-controlled actuation system operative to automatically place the material layers in position prior to consolidation.

19. The method of claim 1, wherein the object is a repair of an existing article.

20. The method of claim 1, further including the steps of:

measuring the contact resistance of the interface between material increments; and using the measured resistance in a closed-loop control system to ensure consistent welding conditions as object geometry changes during consolidation.

* * * * *